United States Patent
Ayirala et al.

(10) Patent No.: US 11,041,109 B2
(45) Date of Patent: Jun. 22, 2021

(54) ENHANCED SURFACTANT POLYMER FLOODING PROCESSES FOR OIL RECOVERY IN CARBONATE RESERVOIRS

(71) Applicant: Saudi Arabian Oil Company, Dhahran (SA)

(72) Inventors: Subhash Ayirala, Dhahran (SA); Abdulkareem M. Al-Sofi, Dhahran (SA); Jinxun Wang, Dhahran (SA); Ali Abdallah Al-Yousef, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 8 days.

(21) Appl. No.: 15/855,438

(22) Filed: Dec. 27, 2017

(65) Prior Publication Data
US 2019/0194524 A1 Jun. 27, 2019

(51) Int. Cl.
*C09K 8/588* (2006.01)
*C09K 8/584* (2006.01)
*C09K 8/04* (2006.01)
*C08F 220/38* (2006.01)
*C08F 220/56* (2006.01)
*C01D 5/10* (2006.01)
*C01F 5/30* (2006.01)
*C01F 5/40* (2006.01)
*C02F 1/68* (2006.01)
*C01D 3/04* (2006.01)
(Continued)

(52) U.S. Cl.
CPC ........... *C09K 8/588* (2013.01); *C01D 3/04* (2013.01); *C01D 5/10* (2013.01); *C01F 5/30* (2013.01); *C01F 5/40* (2013.01); *C02F 1/68* (2013.01); *C08F 220/38* (2013.01); *C08F 220/56* (2013.01); *C09K 8/04* (2013.01); *C09K 8/584* (2013.01); *E21B 43/20* (2013.01); *C02F 2103/08* (2013.01); *C08F 220/382* (2020.02)

(58) Field of Classification Search
CPC ..................................................... C07C 309/00
See application file for complete search history.

(56) References Cited

U.S. PATENT DOCUMENTS 770,641 A 9/1904 Houghtaling
4,004,638 A 1/1977 Burdyn et al.
(Continued)

OTHER PUBLICATIONS

Yousef, et al., Optimization Study of a Novel Water-Ionic Technology for Smart-Waterflooding Application in Carbonate Reservoirs, Oil and Gas Facilities, Oct. 2014, pp. 72-82, SPE169052.
(Continued)

*Primary Examiner* — William D Hutton, Jr.
*Assistant Examiner* — Avi T Skaist
(74) *Attorney, Agent, or Firm* — Bracewell LLP; Constance G. Rhebergen

(57) ABSTRACT

A composition for use in surfactant polymer flooding processes in a carbonate reservoir, the composition comprising a surfactant, the surfactant operable to reduce interfacial tension, a polymer, the polymer operable to increase the viscosity of the composition, and a tailored water, the tailored water operable to alter a wettability of the in-situ rock, where the tailored water has a total dissolved solids of between 5,000 wt ppm and 7,000 wt ppm, where the total dissolved solids comprises a salt, where the composition has a viscosity between 3 cP and 100 cP.

5 Claims, 3 Drawing Sheets

(51) Int. Cl.
*E21B 43/20* (2006.01)
*C02F 103/08* (2006.01)

(56) References Cited

U.S. PATENT DOCUMENTS

| | | | |
|---|---|---|---|
| 4,216,097 A * | 8/1980 | Stournas | B01F 17/0042 |
| | | | 166/270.1 |
| 4,266,611 A | 5/1981 | Bousaid et al. | |
| 4,271,906 A | 6/1981 | Bousaid et al. | |
| 4,438,814 A | 3/1984 | Bousaid | |
| 4,554,974 A * | 11/1985 | Kalpakci | C09K 8/584 |
| | | | 166/246 |
| 4,756,370 A | 7/1988 | Debons | |
| 4,825,950 A | 5/1989 | Kalpakci et al. | |
| 4,979,564 A | 12/1990 | Kalpakci et al. | |
| 5,076,363 A | 12/1991 | Kalpakci et al. | |
| 9,085,971 B2 | 7/2015 | Janssen et al. | |
| 9,399,903 B2 | 7/2016 | Janssen et al. | |
| 2007/0191633 A1* | 8/2007 | Berger | C09K 8/584 |
| | | | 562/41 |
| 2008/0011475 A1* | 1/2008 | Berger | C09K 8/584 |
| | | | 166/270.1 |
| 2009/0281003 A1* | 11/2009 | Shahin | C09K 8/584 |
| | | | 507/219 |
| 2011/0306525 A1 | 12/2011 | Lighthelm | |
| 2012/0018160 A1* | 1/2012 | Al-Yousef | C09K 8/58 |
| | | | 166/305.1 |
| 2012/0125605 A1* | 5/2012 | Willingham | B01D 61/002 |
| | | | 166/270.1 |
| 2014/0048273 A1 | 2/2014 | Southwick et al. | |
| 2014/0051609 A1 | 2/2014 | Southwick et al. | |
| 2014/0262275 A1 | 9/2014 | Dean et al. | |
| 2014/0345862 A1* | 11/2014 | Jerauld | E21B 43/16 |
| | | | 166/275 |
| 2015/0148269 A1 | 5/2015 | Tamsilian et al. | |
| 2016/0032170 A1* | 2/2016 | Li | C09K 8/588 |
| | | | 166/305.1 |
| 2017/0204322 A1 | 7/2017 | Ayirala et al. | |

OTHER PUBLICATIONS

Zang, et al., Wettability Alteration and Improved Oil Recovery by Spontaneous Imbibition of Seawater into Chalk: Impact of the Potential Determining Ions $Ca^{2+}$, $Mg^{2+}$, and $SO_4^{2-}$, ScienceDirect-Colloids and Surfaces A: Physicochem. Eng. Aspects 301(2007)199-208.

The International Search Report and Written Opinion for related PCT application PCT/US2018/067526 dated Mar. 1, 2019. (SA5778).

De Martins et al., "Studies on Anionic Surfactant Structure in the Aggregation with (Hydroxypropyl) cellulose", Ciencia e Tecnologia, 2002, pp. 109-114, vol. 12, No. 2.

Khuman et al., "Viscosity-Temperature Behavior of Hydroxypropyl Cellulose Solution in Presence of an Electrolyte or a Surfactant: A Convenient Method to Determine the Cloud Point of Polymer Solutions", Journal of Macromolecular Science, Part A, 2014, 7 Pages.

Veggeland et al., "Polymer-Surfactant Interactions Studied by Phase Behavior, GPC, and NMR", Langmuir, 1995, pp. 1885-1892, vol. 11, No. 6, American Chemical Society.

Ayirala, S.C., Uehara-Nagamine, E., Matzakos, A., Chin, R., Doe, P. and van Den Hoek, P., "A Designer Water Process for Offshore Low Salinity and Polymer Flooding Applications." SPE 129926, Apr. 2010.

Alagic, E. and Skauge, A., "Combined Low Salinity Brine Injection and Surfactant Flooding in Mixed-Wet Sandstone Cores", Energy & Fuels, 24 (2010), pp. 3551-3559.

Austad, T., Shariatpanahi, S., Strand, S., Black, J., and Webb, K., "Conditions for a Low-Salinity Enhanced Oil Recovery (EOR) effect in Carbonate Oil Reservoirs.", Energy & Fuels, 26 (1), 2012, pp. 569-575.

Mohammadi, H. and Jerauld, G.R., "Mechanistic Modeling of the Benefit of Combining Polymer with Low Salinity Water for Enhanced Oil Recovery", SPE 153161, Apr. 2012.

Shiran, B.S. and Skauge, A., "Enhanced Oil Recovery (EOR) by combined Low Salinity Water/Polymer Flooding", Energy & Fuels, 2013 (27), pp. 1223-1235.

Yousef, A.A., Al-Saleh, S., Al-Kaabi, A. and Al-Jawfi, M., "Laboratory Investigation of the Impact of Injection-Water Salinity and Ionic Content on Oil Recovery from Carbonate Reservoirs.", SPE Reservoir Evaluation & Engineering, Oct. 2011, pp. 578-593.

Tavassoli, S., Korrani, A.K.N., Poe, G.A. and Sepehmoori, K., "Low Salinity Surfactant Flooding—A Multi-Mechanistic Enhanced Oil Recovery Method", SPE 173801, Apr. 2015.

* cited by examiner

ENHANCED SURFACTANT POLYMER FLOODING PROCESSES FOR OIL RECOVERY IN CARBONATE RESERVOIRS

TECHNICAL FIELD

Embodiments disclosed relate to surfactant polymer flooding processes. Specifically disclosed are compositions and methods for using tailored water formulations in surfactant polymer flooding processes.

DESCRIPTION OF THE RELATED ART

Surfactant polymer (SP) flooding processes are one of the most prominent chemical enhanced oil recovery technologies and have gained positive attention in recent years for oil recovery in carbonate reservoirs. In surfactant polymer flooding processes, both surfactant and polymer chemicals are used, where the chemical slug and polymer drive each have their own effects to contribute for oil recovery enhancement. The polymer viscosifies the water to provide mobility control, and the surfactant reduces oil-water interfacial tension (IFT) by two to three orders of magnitude to overcome the capillary trapping of crude oil in pore throats. Both of these phenomena contribute to improved macroscopic and microscopic sweep efficiencies in the reservoir to result in enhanced oil recovery (EOR).

Polyacrylamide based polymers or co-polymers are the most widely employed polymers for EOR today in the industry. Anionic in nature, the viscosifying characteristics of polyacrylamide based polymers are hindered with increased salinity due to the monovalent cations and divalent cations present in the makeup water. As a result, increased dosages of polymer in high salinity water, including seawater, are typically required to achieve desired viscosities needed for proper mobility control.

SUMMARY

Embodiments disclosed relate to surfactant polymer flooding processes. Specifically disclosed are compositions and methods for using tailored water formulations in surfactant polymer flooding processes.

In a first aspect, a composition for use in surfactant polymer flooding processes in a carbonate reservoir is provided. The composition includes a surfactant operable to reduce interfacial tension, a polymer operable to increase the viscosity of the composition, and a tailored water, the tailored water operable to alter a wettability of the in-situ rock, where the tailored water has a total dissolved solids of between 5,000 parts-per-million by weight (wt ppm) and 7,000 wt ppm, where the total dissolved solids comprises a salt, where the composition has a viscosity between 3 centiPoise (cP) and 100 cP.

In certain aspects, the surfactant is selected from the group consisting of betaine-type amphoteric surfactants, anionic surfactants, cationic surfactants, non-ionic surfactants, biosurfactants, and combinations of the same. In certain aspects, the polymer is selected from the group consisting of polyacrylamides, partially hydrolyzed polyacrylamides, copolymers of acylamide and acrylate, copolymers of acrylamide tertiary butyl sulfonate (ATBS) and acrylamides, and copolymers of acrylamide, acrylic acid and ATBS. In certain aspects, the surfactant is present at a concentration in the range between 0.05 percent by weight (wt %) of the tailored water formulation and 2 wt % of the tailored water formulation. In certain aspects, the polymer is present at a concentration in the range between 0.05 wt % of the tailored water formulation and 0.5 wt % of the tailored water formulation. In certain aspects, the salt is selected from the group consisting of sodium chloride, calcium chloride, magnesium chloride, sodium sulfate, magnesium sulfate, sodium bicarbonate, and combinations of the same. In certain aspects, the tailored water includes calcium ions in the range between 50 wt ppm and 500 wt ppm. In certain aspects, the tailored water includes magnesium ions in the range between 50 wt ppm and 500 wt ppm. In certain aspects, the tailored water includes sulfate ions in the range between 300 wt ppm and 1,000 wt ppm.

In a second aspect, a method of recovering oil from in-situ rock in a carbonate reservoir is provided. The method includes the steps of injecting a first injection into an injection well, where the first injection includes a slug of a tailored water with polymer, where the first injection has a viscosity between 3 cP and 100 cP, injecting a second injection into the injection well, where the second injection includes a slug of a tailored water formulation, where the tailored water formulation has a viscosity between 3 cP and 100 cP, injecting a third injection into the injection well, where the third injection includes a slug of the tailored water with polymer, where the third injection has a viscosity between 3 cP and 100 cP, injecting a fourth injection into the injection well, where the fourth injection includes a slug of the tailored water; and allowing the slugs to interact with the in-situ rock to produce mobilized oil, where the interaction between the slugs and the in-situ rock is operable to free oil from pores of the in-situ rock, where the mobilized oil includes the freed oil.

In certain aspects, the method further includes the steps of injecting a chase seawater into the injection well, and pushing the mobilized oil toward a production well with the chase seawater, where the production well is fluidly connected to the injection well, such that the mobilized oil can be produced from the production well. In certain aspects, the total volume of the slug of the tailored water with polymer in the first injection is between 0.01 pore volumes (PV) and 0.1 PV. In certain aspects, the total volume of the slug of the tailored water formulation in the second injection is between 0.1 PV and 0.5 PV. In certain aspects, the total volume of the slug of the tailored water with polymer in the third injection is between 0.3 PV and 1.0 PV. In certain aspects, the total volume of the slug of the tailored water in the fourth injection is between 1.0 PV and 2.0 PV. In certain aspects, where the tailored water has a total dissolved solids of between 5,000 wt ppm and 7,000 wt ppm, where the total dissolved solids includes a salt. In certain aspects, the tailored water formulation includes a tailored water, a polymer, and a surfactant. In certain aspects, the tailored water includes calcium ions in the range between 50 wt ppm and 500 wt ppm, where the tailored water includes magnesium ions in the range between 50 wt ppm and 500 wt ppm, and further where the tailored water includes sulfate ions in the range between 300 wt ppm and 1,000 wt ppm.

In a third aspect, a method of making a tailored water formulation is provided. The method includes the steps of treating a seawater with a water chemistry alteration technology to produce a tailored water, where the tailored water operable to alter a wettability of the in-situ rock, where the tailored water has a total dissolved solids of between 5,000 wt ppm and 7,000 wt ppm, adding a polymer to the tailored water, adding a surfactant to the tailored water to form the tailored water formulation, and mixing the tailored water formulation, where the tailored water formulation has a viscosity between 3 cP and 100 cP.

BRIEF DESCRIPTION OF THE DRAWINGS

These and other features, aspects, and advantages of the scope of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Figure 1:
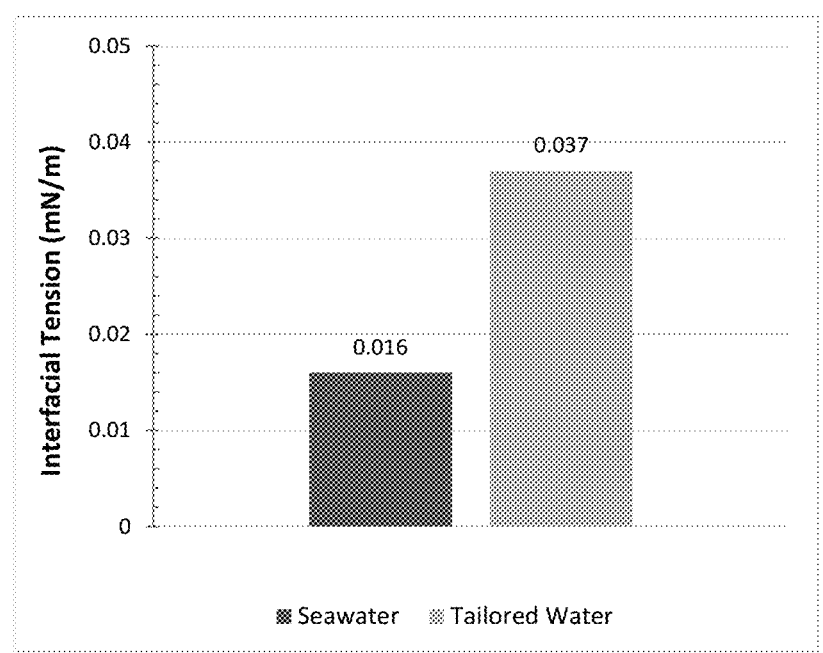
FIG. 1 is a graph of the interfacial tension reduction of surfactant in tailored water compared to seawater.

So that the manner in which the features and advantages of the embodiments of composition and methods, as well as others, which will become apparent, may be understood in more detail, a more particular description of the embodiments of the present disclosure briefly summarized previously may be had by reference to those embodiments, which are illustrated in the appended drawings, which form a part of this specification. While the scope of the composition and method will be described with several embodiments, it is understood that one of ordinary skill in the relevant art will appreciate that many examples, variations and alterations to the apparatus and methods described here are within the scope and spirit of the embodiments. Accordingly, the embodiments described are set forth without any loss of generality, and without imposing limitations, on the embodiments. Those of skill in the art understand that the scope includes all possible combinations and uses of particular features described in the specification.

Described here are compositions for use in surfactant polymer flooding processes. Advantageously, the tailored water formulations for use in surfactant polymer flooding processes interact favorably with in-situ rock of and fluids present in the carbonate reservoir to alter wettability and improve microscopic sweep efficiency, resulting in increased release of oil from the pores in the in-situ rock. Advantageously, the tailored water formulations for use in surfactant polymer flooding processes can improve the economics as compared to conventional chemical flooding processes.

Advantageously, the tailored water formulations result in increased oil recovery as compared to a polymer flooding process. In polymer flooding processes, the addition of polymer to the injection water increases the aqueous phase viscosity, reducing the water to oil mobility ratio during the displacement. The reduced water to oil mobility ratio reduces viscous fingering and improves the macroscopic sweep efficiency of the injection fluid in the reservoir. In contrast, the tailored water formulation involves the injection of a tailored water containing both a surfactant and a polymer into the reservoir. The surfactant can reduce the oil-water interfacial tension, by two to three orders of magnitude, improving microscopic sweep efficiency from the pores of in-situ rock. Thus, advantageously, the use of tailored water formulations in injection processes results in increased oil recovery due to the combined effect of increased microscopic sweep efficiency (due to surfactant) and macroscopic sweep efficiency (due to the polymer) as compared to polymer flooding processes, where only macroscopic sweep efficiency improvements are possible.

As used throughout, "in-situ rock" refers to reservoir rock exposed to the native conditions of temperature, pressure, and overburden stresses as represented in a typical carbonate reservoir.

As used throughout, "seawater" refers to a high salinity water on the order of about 35,000 wt ppm to 56,000 wt ppm TDS that can include up to 3000 wt ppm divalent cations.

As used throughout, "divalent ions" includes, but is not limited to calcium, magnesium, and sulfate. As will be understood by one of the art, calcium and magnesium are cations.

As used throughout, "monovalent ions" includes, but is not limited to, sodium and chloride.

As used throughout, "incremental oil recovery" refers to an increase in oil recovery in terms of percent original oil in place over any base case, or conventional recovery process as a regular water flood.

As used throughout, "the pore scale" refers to the scale corresponding to the pore size diameter range of the pore space of the in-situ rock, typically on the order of a 2-5 microns.

As used throughout, "microscopic sweep efficiency" refers to sweep efficiency of displacing fluid at the pore scale. Microscopic sweep efficiency is a measure of how effectively the injection fluid mobilizes and displaces oil from the pores in the reservoir in-situ rock.

As used throughout, "macroscopic sweep efficiency" or "volumetric sweep efficiency" refers to sweep efficiency of displacing fluid at the reservoir scale. Macroscopic sweep efficiency is a measure of how effectively the displacing fluid contacts the volume of a reservoir both areally and vertically.

As used throughout, "mobility ratio" refers to the ratio of the mobility of an injection fluid (such as water) to the mobility of the displaced fluid (such as crude oil). As used throughout, "mobility" is defined as the ratio of effective permeability to viscosity. The effective permeability can be determined at the water saturation ahead of the displacement front for the oil while at the water saturation behind the displacement front for the injection fluid. Typically, a mobility ratio of less than or equal to one is targeted to provide piston like displacement and avoid viscous fingering.

As used throughout, "synergy" refers to the additive effect of the favorable interaction of a secondary recovery process (such as tailored water chemistry) to improve the performance and economics of a primary recovery process (such as a surfactant polymer flooding) without losing the individual recovery benefits of two processes when combined.

As used throughout, "carbonate reservoirs" refers to a sedimentary rock condition deposited in a marine environment and mostly made up of calcium carbonate. Carbonate reservoirs are chemically active and can undergo a range of physical and chemical processes known as diagenesis. Diagenesis alters the rock structure to show large abrupt variations in rock properties such as porosity.

As used throughout, "surfactant polymer flooding" refers to the injection of surfactant polymer solutions to improve both microscopic sweep efficiency and macroscopic sweep efficiency. The surfactant reduces the oil-water interfacial tension by two to three orders of magnitude to significantly reduce capillary forces and improve the microscopic sweep efficiency. A surfactant polymer flooding differs from a water flooding process in that water flooding processes use water without surfactant or polymer additives, such as seawater, for injection into reservoirs to provide some pressure support and physically displace oil from the injection wells to the producing wells. A surfactant polymer flooding process differs from a polymer flooding in that polymer flooding processes use only polymer to increase the viscosity of the injected water for better reservoir contact to improve volumetric sweep efficiency, but not microscopic sweep efficiency due to the absence of surfactant.

As used throughout, "total dissolved solids" or "TDS" refers to the sum of the combined amount of all inorganic salts contained in the injection water in the form of charged ions, such as monovalent ions and divalent ions. TDS can also be considered a measure of the salinity of a tailored water.

As used throughout, "betaine-type amphoteric surfactant" refers to a surfactant that contains an inner quaternary ammonium group that is linked to a terminal sulfonate group or carboxylate group. The electrical charge on the inner quaternary group is electrically balanced by the terminal anionic group; and these surfactants can thus be characterized as dipolar ions or zwitterions.

As used throughout, "pore volume" or "PV" refers to the cumulative volume of the void spaces in the in-situ rock, between the injection well and the production well, that contains fluids. Pore volumes can be obtained by multiplying the bulk rock volume with the porosity of the in-situ rock. Porosity of the in-situ rock can be determined from well logs in the field or from using standard techniques, such as volume saturration with brine of core samples in a lab environment. Because the reservoir fluids, including oil, are contained in the in-situ rock pore volume, that injection slug volumes can be determined on a pore volume basis.

As used throughout, "in the absence" means does not contain, does not include, or contains less than a measureable amount.

A tailored water formulation for use in a surfactant polymer flooding process is provided. The tailored water formulation includes a tailored water, a surfactant, and a polymer. The tailored water can have a total dissolved solids between 5,000 parts-per-million (wt ppm) and 7,000 wt ppm. The monovalent ions and divalent ions as TDS can be present in the form of salts in the tailored water. The tailored water can include one or more salts. Examples of salts useful in the present embodiments can include sodium chloride (NaCl), calcium chloride ($CaCl_2$), magnesium chloride ($MgCl_2$), sodium sulfate ($Na_2SO_4$), magnesium sulfate ($MgSO_4$), sodium bicarbonate ($NaHCO_3$) and combinations of the same. The tailored water can include calcium ions and magnesium ions in the range between 50 wt ppm and 500 wt ppm, alternately between 50 wt ppm and 200 wt ppm, and alternately between 200 wt ppm and 500 wt ppm. The tailored water can include sulfate ions in the range from between 300 wt ppm and 1,000 wt ppm, alternately between 300 wt ppm and 400 wt ppm, alternately between 300 wt ppm and 500 wt ppm, alternately between 300 wt ppm and 700 wt ppm, and alternately between 300 wt ppm and 900 wt ppm. Calcium ions and magnesium ions are divalent cations and can be identified as hardness ions. The salts used can be selected to provide the specific combination of ions. The specific combination of ions is selected such that the tailored water includes the three key ions: sulfate, calcium, and magnesium. Sulfate ions first get adsorbed on a carbonate surface to decrease the positive charge. As a result of the reduced electrostatic repulsion, calcium ions can bond with the negatively charged carboxylic groups of the carbonate surface, thereby releasing oil from the carbonate surface. The process can be more active at increased temperatures because the calcium ions can be substituted for magnesium ions. The reactivity of magnesium ions is kinetically hindered at temperatures of less than 70 deg C. because magnesium ion reactivity is temperature dependent. At temperatures greater than 70 deg C., magnesium ions can replace the calcium ions bonded to the carbonate surface, freeing the calcium ions to bond to other negatively charged carboxylic groups. Without being bound to a particular theory, it is believed that the process does not work with only sulfates in the absence of calcium and magnesium ions. The tailored water can alter the wettability of the in-situ rock, improve microscopic sweep efficiency in the carbonate reservoir, and combine synergistically with the surfactant and the polymer to enhance the performance of both.

The surfactant can be any type of surfactant capable of reducing the interfacial tension of the oil-water interface in the in-situ rock in a tailored water. Examples of the surfactant include betaine-type amphoteric surfactants, anionic surfactants, cationic surfactants, non-ionic surfactants, bio-surfactants, and combinations of the same. Examples of the anionic surfactants include sulfate-containing compounds, carboxylate-containing compounds, sulfonate-containing compounds, and combinations of the same. Examples of the sulfate-containing compounds include sulfate-containing propylene oxide based compounds, sulfate-containing ethylene oxide based compounds, and sulfate-containing propylene oxide-ethylene oxide compounds. Examples of sulfate-containing compounds include NEODOL® 67, a propoxylated sulfate having seven propylene oxide units on average, from Shell (Houston, Tex.) and ENORDET® A771, an alcohol alkoxy sulfate (AAS) surfactant, from Shell Chemicals (Houston, Tex.). Examples of the sulfonate-containing compounds can include alpha olefin sulfonate, internal olefin sulfonate, and alkyl aryl sulfonate. An example of an internal olefin sulfonate includes ENORDET® O332 surfactant from Shell Chemicals (Houston, Tex.). An example of a nonionic surfactant includes NEODOL® alcohols and ethoxylates from Shell (Houston, Tex.), such as an ethoxylated-propoxylated alcohol. In at least one embodiment, the surfactant is a mixture of a cationic and anionic surfactants. The surfactant is present in the tailored water formulation at a concentration in a range between 0.05 percent by weight (wt %) of the tailored water formulation and 2 wt % of the tailored water formulation. The tailored water and the surfactant synergistically increases the overall microscopic sweep efficiency as compared to the surfactant in an aqueous fluid that is not a tailored water. The synergy of tailored water and the surfactant can reduce the interfacial tension to an extent greater than surfactant in an aqueous fluid that is not a tailored water. The use of tailored waters can result in increased alteration of the wettability effect in carbonates, which would not have been otherwise achieved by using conventional aqueous fluids such as seawater. In addition, the use of tailored water does not hinder the ability of the surfactant to reduce interfacial tension.

The polymer can be any type of polymer capable of increasing the viscosity of the tailored water. Examples of the polymer include sulfonated polyacrylamides, partially hydrolyzed polyacrylamides, copolymers of acylamide and acrylate, copolymers of acrylamide tertiary butyl sulfonate (ATBS) and acrylamides, and copolymers of acrylamide, acrylic acid and ATBS. The sulfonated polyacrylamide is a copolymer of acrylamide and acrylamide tertiary-butyl sulfonate with a sulfonation degree of about 25%. The polymer in the tailored water formulation is present at a concentration in the range between 0.05 wt % of the tailored water formulation and 0.5 wt % of the tailored water formulation. The synergy of the tailored water and the polymer can increase the viscosifying characteristics of the polymer as compared to the polymer in an aqueous fluid that is not a tailored water. The viscosity increase due to the addition of polymer in a tailored water can be 1.5 to 3.0 times greater as compared to an aqueous fluid that is not a tailored water. Due to the synergy of the tailored water and the polymer less polymer can be used in the tailored water formulation to achieve a greater amount of oil recovery as compared to the polymer in an aqueous fluid that is not a tailored water. The amount of polymer in a tailored water formulation can be 10 wt % to 50 wt % less than the amount of polymer in an aqueous fluid that is not a tailored water.

The tailored water formulation can have a viscosity between 3 cP and 100 cP. The tailored water formulation can have a salinity in the range between 5,000 wt ppm TDS and 7,000 wt ppm TDS, a surfactant concentration in the range between 0.05 wt % to 2.0 wt %, and polymer concentration in the range between 0.05 wt % and 0.5 wt %.

In at least one embodiment, the tailored water formulation can be used in a secondary oil recovery process in carbonate reservoirs. In at least one embodiment, the tailored water formulation can be used in a tertiary oil recovery process. In at least one embodiment, the tailored water formulation can be used in both a secondary oil recovery process and a tertiary oil recovery process. Secondary oil recovery processes can be implemented in a green field after depletion of natural pressure support. Tertiary oil recovery process can be applied in matured oil fields after secondary oil recovery processes. Because the tailored water formulations are aqueous based, the tailored water formulations can be used in both types of oil recovery processes.

In a first injection, a slug of the tailored water with polymer is pumped through an injection well, the total volume of the slug injected through the injection well is between 0.01 pore volumes (PV) and 0.1 PV. In the first injection, the amount of polymer is in the range between 0.05 wt % and 0.5 wt % of the total volume. During the first injection, the polymer can adsorb at the surface of the in-situ rock sites and reduce the access to active surface sites for the adsorption of surfactant in the second injection. The tailored water in the first injection, can pre-treat the reservoir to create a favorable environment for the tailored water formulation to act in oil recovery by mitigating the adverse effects due to the salinity of the formation water in the reservoir. As a result of these functions, the first injection prepares the reservoir for the second injection. The first injection is followed by a second injection.

In the second injection, a slug of the tailored water formulation is injected through the injection well at a total volume of the slug between 0.1 PV and 0.5 PV. The tailored water formulation in the second injection can free the oil present in the pores of the rock formation to produce a mobilized oil, enhanced by both the surfactant and polymer present in the tailored water formulation, improving the microscopic sweep efficiency. The second injection is followed by a third injection.

In the third injection, a slug of the tailored water with polymer is injected through the injection well at a total volume of between 0.3 PV and 1.0 PV. The third injection can enhance the contact between the fluids and the reservoir, improving macroscopic sweep efficiency. In addition, the third injection maintains the benefit on the microscopic sweep efficiency due to the tailored water formulation of the second injection. The third injection is followed by a fourth injection.

The fourth injection includes a slug of the tailored water with a total volume injected through the injection well in the range of between 1.0 PV and 2.0 PV. The fourth injection can maintain the integrity of the slugs, which can maintain the effect of the tailored water formulation in wettability alteration. Additionally, the fourth injection can act as a buffer between the chase seawater and the tailored water with polymer of the third injection.

While the mobilized oil is primarily freed during interaction between the tailored water formulation and the in-situ rock during the second injection, each of the first injection through fourth injectiosn contribute to the production of mobilized oil, the oil freed from the pores of the in-situ rock. The particular order of injection of each fluid contributes to producing a maximum amount of mobilized oil.

Finally, a chase seawater, having a salinity greater than 35,000 wt ppm is injected to drive the four injections slugs through the formation. As each of the slugs of each injection move through the formation it interacts with the in-situ rock continuing to produce amounts of mobilized oil. The mobilized oil is pushed by the injections toward the production well. In at least one embodiment, the chase seawater injection continues until the production of the mobilized oil from the production well is negligible.

In at least one embodiment, the second injection of the tailored water formulation can be followed by a third injection of a tailored water with polymer with a total volume injected through the injection well in the range of between 1.0 PV and 2.0 PV. The third injection can serve as a buffer to prevent interaction between the seawater chase, having a salinity of greater than 35,000 wt ppm, and the second injection of the tailored water formulation. Interaction, such as mixing, between the tailored water formulation and the seawater can be avoided to maintain quality of the tailored water formulation. Introducing a seawater chase after the tailored water formulation can result in mixing between the seawater chase and the tailored water formulation at the trailing edge of the tailored water formulation, degrading that segment of the tailored water formulation slug.

The tailored water formulations can be produced at the well site. The tailored water can be obtained by treating seawater with a water chemistry alteration technology. The water chemistry alteration technology be a pressure driven membrane based desalination technology. Example of pressure driven membrane based desalination technology can include reverse osmosis technology and combinations of reverse osmosis technology and nanofiltration technology. In reverse osmosis technology, salt ions are removed from a seawater until a target amount of TDS is remaining in the treated fluid. In embodiments using a reverse osmosis technology, the tailored water is produced by mixing the treated fluid with a volume of seawater, where the volume of seawater is reduced as compared to the volume of the treated fluid. In at least one embodiment, the treated fluid is mixed with seawater at a volumetric ratio of 9:1. In nanofilitration technology, divalent ion, such as calcium, magnesium and sulfates, are removed from the seawater to produce a divalent rich water. In embodiments using a combination of reverse osmosis technology and nanofiltration technology, the tailored water is produced by mixing the treated fluid from the reverse osmosis process with the divalent rich water, where the volume of treated fluid is greater than the volume of divalent rich water. In at least one embodiment, the treated fluid is mixed with the divalent rich water at a volumetric ratio of 9:1. The surfactant and polymer can be added to the tailored water to obtain the tailored water formulation. The surfactant can be added as a concentrated liquid. The polymer can be added as a dry powder or as a liquid emulsion. In embodiments where the polymer is added as a dry powder, the polymer can be added using dry slicing units, maturation tanks, or mixing tanks. The tailored water formulation can be prepared in any kind of unit capable of mixing an aqueous solution and providing the aqueous solution to an injection fluid.

The use of tailored water in the tailored water formulation can reduce the polymer concentration by 50% as compared to the use of an aqueous fluid that is not a tailored water. The use of the tailored water formulation can increase the incremental oil recovery by about 5% as compared to a conventional surfactant-polymer flooding process.

The tailored water formulation is in the absence of an alkali, such as an alkali salt, where an alkali reduces a surfactant concentration and reduces the adsorption of surfactant on the in-situ rock due to high pH. Moreover, alkalis are not stable in the presence of divalent cations, such as calcium and magnesium, at concentrations greater than 100 wt ppm. The tailored water formulation is in the absence of a polysaccharide. The tailored water formulation is in the absence of a paraffin inhibitor.

EXAMPLE

Six preserved core plug samples from a Saudi Arabian carbonate reservoir were prepared for core flood tests, the properties of the core plug samples are described in Table 1. Composite core samples were built using two plugs each, as indicated in Table 1. The composite core samples were used for oil displacement tests to demonstrate the effectiveness of the tailored water formulations on oil recovery improvement. After each coreflooding test, the composite core samples were thoroughly cleaned to remove oil and salts, and then grain density, ambient porosity and air permeability were measured. The ambient porosity of the core plug samples was in the range from 23.8% to 29.3%. The air permeability of the core plug samples was in the range from 123 millidarcys (md) to 418 md.

TABLE 2

Summary of Water Compositional Data

| Ions | Seawater (wt ppm) | Tailored water (wt ppm) |
|---|---|---|
| Sodium ($Na^+$) | 18,300 | 1,824 |
| Calcium ($Ca^+$) | 650 | 65 |
| Magnesium ($Mg^+$) | 2,110 | 211 |
| Sulfate ($SO_4^{2-}$) | 4,290 | 429 |
| Chloride ($Cl^-$) | 32,200 | 3,220 |
| Bicarbonate ($HCO_3^-$) | 120 | 12 |
| TDS | 57,670 | 5,761 |

The results on measured crude oil-water interfacial tension (IFT) data using 1000 wt ppm surfactant in tailored water and 2000 wt ppm surfactant in seawater at 90 degrees Celsius (deg C.) are shown in FIG. 1. As can be seen from these data, the surfactant in tailored water can achieve an IFT reduction performance of at least the same as surfactant in seawater. Basically the IFT was reduced by about 2 orders of magnitude with both these high salinity and low salinity aqueous phases as compared to the IFT of plain water which can be in the range of 15-25 milliNewtons per meter (mN/m). This result confirms that the lower salinity tailored water will not adversely impact the performance of surfactant to mobilize the residual oil through the IFT reduction mechanism.

The potential for surfactant polymer flooding and the combined use of tailored water flooding for oil recovery improvement was evaluated by coreflooding tests at reservoir conditions. The composite core samples were prepared for the tests by flushing with dead crude oil. Dead crude oil is oil at ambient conditions (ambient temperature and ambi-

TABLE 1

Properties of Selected Core Plug Samples

| Core Plug Sample | Length (centimeter (cm)) | Diameter (cm) | Ambient Porosity (%) | Ambient Air Permeability (md) | Grain Density (grams per cubic centimeter ($g/cm^3$)) | Composite Core Sample |
|---|---|---|---|---|---|---|
| 1 (S-67) | 6.041 | 3.781 | 28.6 | 418 | 2.699 | Test #1 |
| 2 (S-77) | 5.261 | 3.769 | 28.4 | 123 | 2.687 | Test #1 |
| 3 (S-105) | 5.739 | 3.778 | 26.7 | 234 | 2.700 | Test #2 |
| 4 (S-111) | 5.694 | 3.778 | 25.1 | 200 | 2.702 | Test #2 |
| 5 (S-49) | 5.550 | 3.775 | 29.3 | 345 | 2.700 | Test #3 |
| 6 (S-115) | 6.042 | 3.781 | 23.8 | 312 | 2.704 | Test #3 |

The surfactant used in this study was a betaine-type amphoteric surfactant, commercially available as SS888 from Oil Chem Technologies (Sugar Land, Tex.). The molecular weight of the surfactant was 430 and it was received as an aqueous solution with an active content of 50%. The polymer used was a sulfonated polyacrylamide, commercially available as AN125 VHM available from SNF Floerger (Andrézieux-Bouthéon, France). AN125 VHM is a copolymer of acrylamide and acrylamide tertiary-butyl sulfonate with a sulfonation degree of about 25%. The molecular weight of the polymer was 12 million Daltons and it was received as powder with an active content of 88%. Chemical solutions were prepared in seawater or tailored water to compare their oil recovery performance in core flow tests. Composition of the seawater and the tailored water used is summarized in Table 2.

ent pressure) that no longer contains any dissolved gases. Dead crude oil is in the absence of volatile components at ambient conditions. Three of the composite core samples, each containing two plugs, were used for the tests, where each test had a different fluid injection sequence. Details on the fluid injection sequence, the volume of fluid slug sizes in pore volume (PV), and basic properties of each of the core plug samples are disclosed in Table 3.

TABLE 3

Summary of Flooding Injection Sequence Scenarios

| Composite Core Sample | Porosity % | Air Permeability (md) | Injection Sequence Fluid | Slug, PV |
|---|---|---|---|---|
| Test #1 | 28.5 | 198 | Tailored water w/polymer (1000 mg/L) | 0.1 |
| | | | Tailored water formulation (1000 mg/L polymer + | 0.2 |

TABLE 3-continued

Summary of Flooding Injection Sequence Scenarios

| Composite Core Sample | Porosity % | Air Permeability (md) | Injection Sequence Fluid | Slug, PV |
|---|---|---|---|---|
| | | | 1000 g/mL surfactant) | |
| | | | Tailored water w/polymer (1000 mg/L) | 0.4 |
| | | | Tailored water | 1.3 |
| | | | Seawater | |
| Test #2 | 25.9 | 216 | Seawater w/polymer (2000 mg/L) | 0.1 |
| | | | Seawater w/polymer (2000 mg/L) + surfactant (1000 mg/L) | 0.2 |
| | | | Seawater w/polymer (2000 mg/L) | 0.4 |
| | | | Seawater | |
| Test #3 | 26.5 | 327 | Seawater | |

The composite core samples were built and loaded into a hydrostatic coreholder of the coreflooding system. The coreflooding system was heated to 99 deg C. overnight to reach temperature equilibrium before the coreflooding test. A net confining pressure of 1970 pounds per square inch gauge (psig) and a backpressure of 3780 psig were applied to simulate reservoir conditions. Each fluid was injected at a constant flow rate of 0.5 mililiters per minute (ml/min). Chemical flooding was conducted in the first two tests (Test #1, Test #2) and plain secondary seawater injection was applied in the third test (Test #3). Test #1 used an injection sequence with different tailored water formulations whereas the seawater formulations were used for the injections in Test #2. The formulations with tailored water used half the dosage of polymer but the same concentration of surfactant as compared to the seawater chemical flooding formulations.

Figure 2:
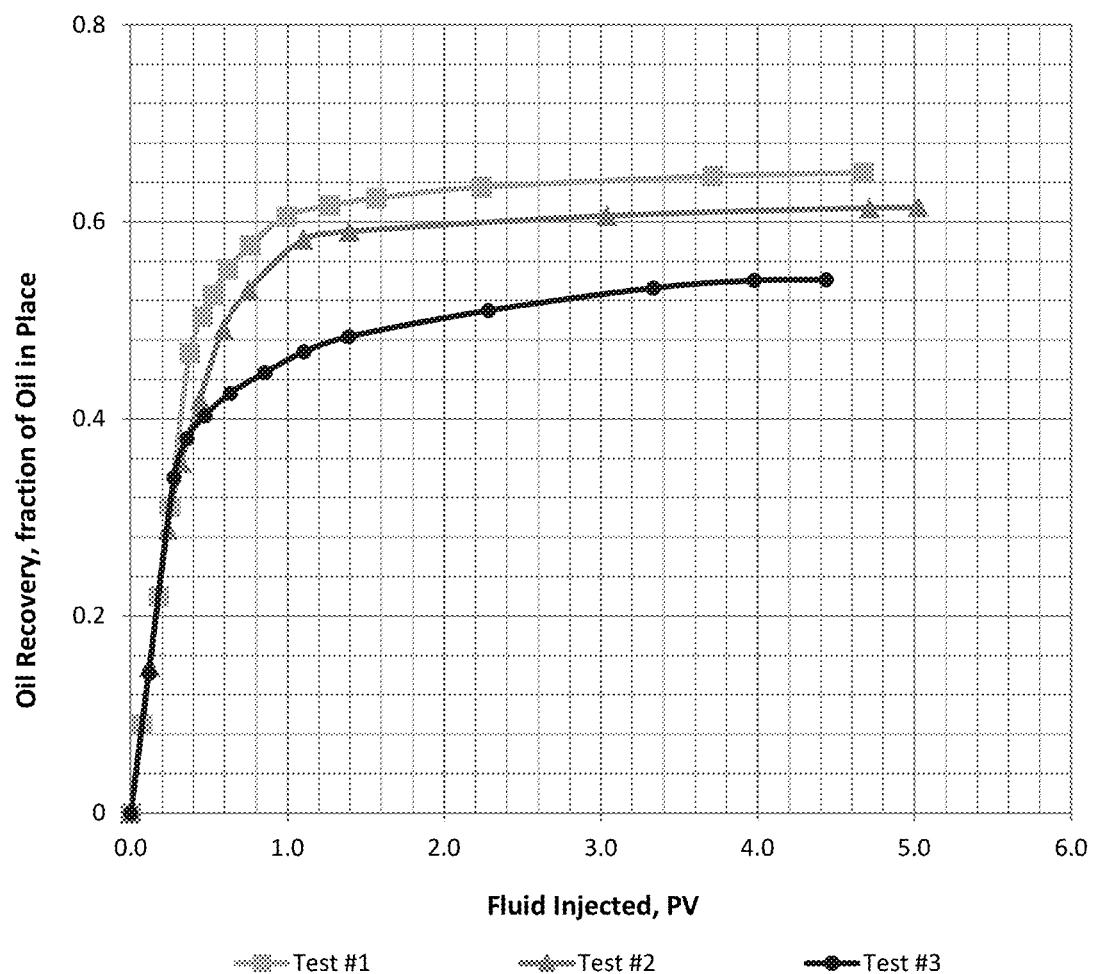
FIG. 2 is a graph of the oil recovery fraction of the coreflooding tests of the Example.

Table 4 summarizes the oil recovery results of the three coreflooding tests, and the oil recovery curves are plotted in FIG. 2. In Table 4, Swi indicates the initial water saturation, calculated as the percentage of water volume occupied in the reservoir (or core sample) pore volume at the initial reservoir condition, before any fluid injection and Ko(Swi) indicates the effective permeability to crude oil at the initial water saturation condition.

The results show chemical flooding with the tailored water formulations achieved the greatest cumulative oil recovery. The tailored water formulations resulted in 11% greater recovery than plain seawater flooding and 3.5% greater than seawater chemical flooding formulations. At 1.0 PV fluid injection, the oil recovery gain by the tailored water formulation is about 15% compared to plain seawater flooding and 4% in comparison to use of seawater chemical flooding formulations.

Therefore, the use of tailored water in chemical flooding can result in greater oil recovery besides accelerating the oil production in early stages. In addition, these greater oil recoveries were achieved at half the dosage of polymer (1000 wt ppm in the tailored water formulations compared to 2000 wt ppm polymer in the seawater chemical flooding formulations). The greater oil recovery can be mainly attributed to the beneficial effect from the lower salinity of the tailored water on the polymer solution viscosities.

Figure 3:
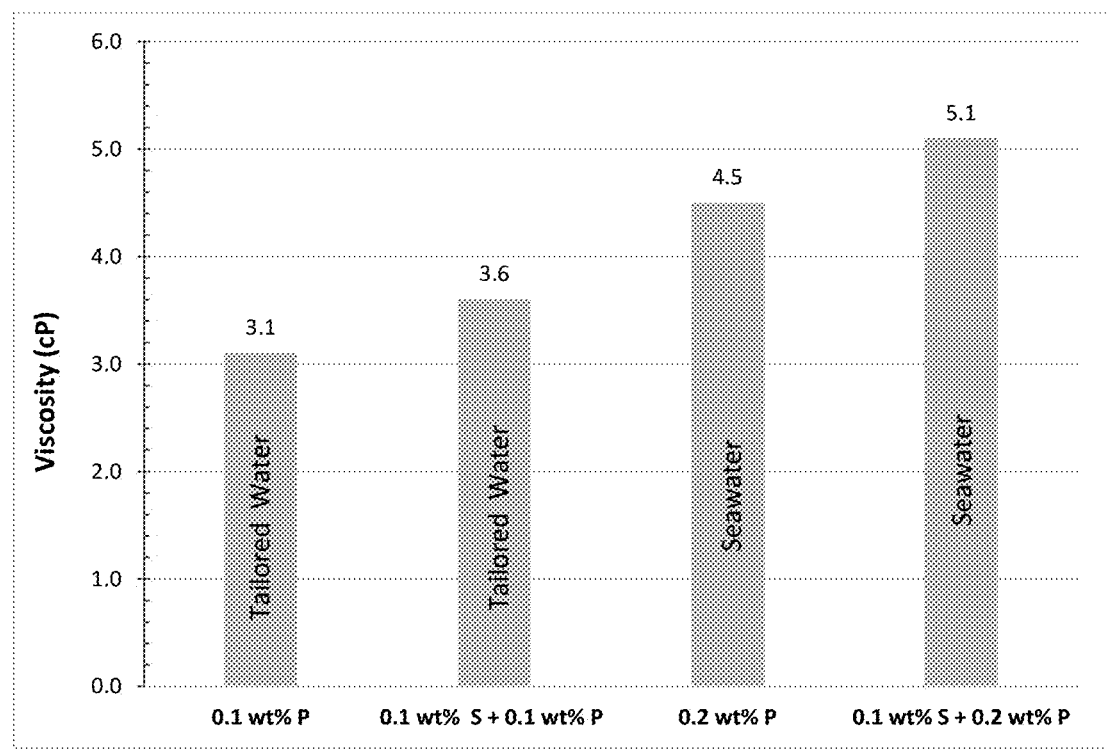
FIG. 3 is a graph of the viscosity of formulations in tailored water compared to seawater.

The comparison of viscosity data obtained with both tailored water and seawater (6.81 $sec^{-1}$ shear rate and 99 deg C.) for the injected polymer (P) and surfactant-polymer (SP) solutions are shown in FIG. 3. As can be seen from this figure the viscosities of the chemical flooding formulations with both the polymer in tailored water and the tailored water formulation are at nearly 70% of the respective viscosities obtained with seawater using double the polymer dosage of the tailored water formulation . Therefore, the tailored water formulations can result in a savings of about 20-30% in polymer consumption requirements to achieve the similar chemical solution viscosities with tailored water when compared to the seawater.

Although the present embodiments have been described in detail, it should be understood that various changes, substitutions, and alterations can be made without departing from the principle and scope. Accordingly, the scope of the embodiments should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed as from about one particular value to about another particular value. When such a range is expressed, it is to be understood that another embodiment is from the one particular value to the other particular value, along with all combinations within said range.

As used throughout and in the appended claims, the words "comprise," "has," and "include" and all grammatical variations of the same are each intended to have an open, non-limiting meaning that does not exclude additional elements or steps.

As used throughout, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and

TABLE 4

Summary of Oil Recovery Results for Chemical Flooding Tests

| Composite Core Sample | Porosity % | 1 Air Permeability (md) | $S_{wi}$*, % | $Ko(S_{wi})$** | Oil Recovery, % OOIC | |
|---|---|---|---|---|---|---|
| | | | | | At 1.0 PV Injection | Cumulative |
| Test #1 | 28.5 | 198 | 19.7 | 130 | 60.6 | 65.0 |
| Test #2 | 25.9 | 216 | 19.9 | 144 | 56.8 | 61.5 |
| Test #3 | 26.5 | 327 | 19.2 | 258 | 45.9 | 54.1 |

"second" does not require that there be any "third" component, although that possibility is contemplated under the scope of the embodiments.

That claimed is:

1. A composition for use in surfactant polymer flooding processes in a carbonate reservoir, the composition comprising:
    a surfactant, the surfactant operable to reduce interfacial tension, where the surfactant is selected from the group consisting of betaine amphoteric surfactants, cationic surfactants, non-ionic surfactants, biosurfactants, and combinations of the same;
    a polymer, the polymer operable to increase a viscosity of the composition; and
    a tailored water, the tailored water operable to alter a wettability of in-situ rock in the carbonate reservoir,
        where the tailored water has a total dissolved solids of between 5,000 wt ppm and 7,000 wt ppm,
        where the total dissolved solids comprises salts, wherein the salts comprise a combination of sulfate ions in a range between 400 wt ppm and 500 wt ppm, calcium ions in a range between 100 wt ppm and 200 wt ppm, and magnesium ions in a range between 50 wt ppm and 200 wt ppm,
        where the composition has a viscosity between 3 cP and 100 cP.

2. The composition of claim 1, where the polymer is selected from the group consisting of copolymers of acrylamide and acrylate, copolymers of acrylamide tertiary butyl sulfonate (ATBS) and acrylamides, and copolymers of acrylamide, acrylic acid and ATBS.

3. The composition of claim 1, where the surfactant is present at a concentration in a range between 0.05 wt % of the tailored water formulation and 2 wt % of the tailored water formulation.

4. The composition of claim 1, where the polymer is present at a concentration in a range between 0.05 wt % of the tailored water formulation and 0.5 wt % of the tailored water formulation.

5. The composition of claim 1, where the salts are selected from the group consisting of sodium chloride, calcium chloride, magnesium chloride, sodium sulfate, magnesium sulfate, sodium bicarbonate, and combinations of the same.

* * * * *